July 24, 1956     O. F. CAMPBELL ET AL     2,755,782
HEAT RECOVERY AND TEMPERATURE CONTROL SYSTEM FOR BED
OF HIGH TEMPERATURE FLUIDIZED SOLIDS
Filed Sept. 9, 1952     3 Sheets-Sheet 1
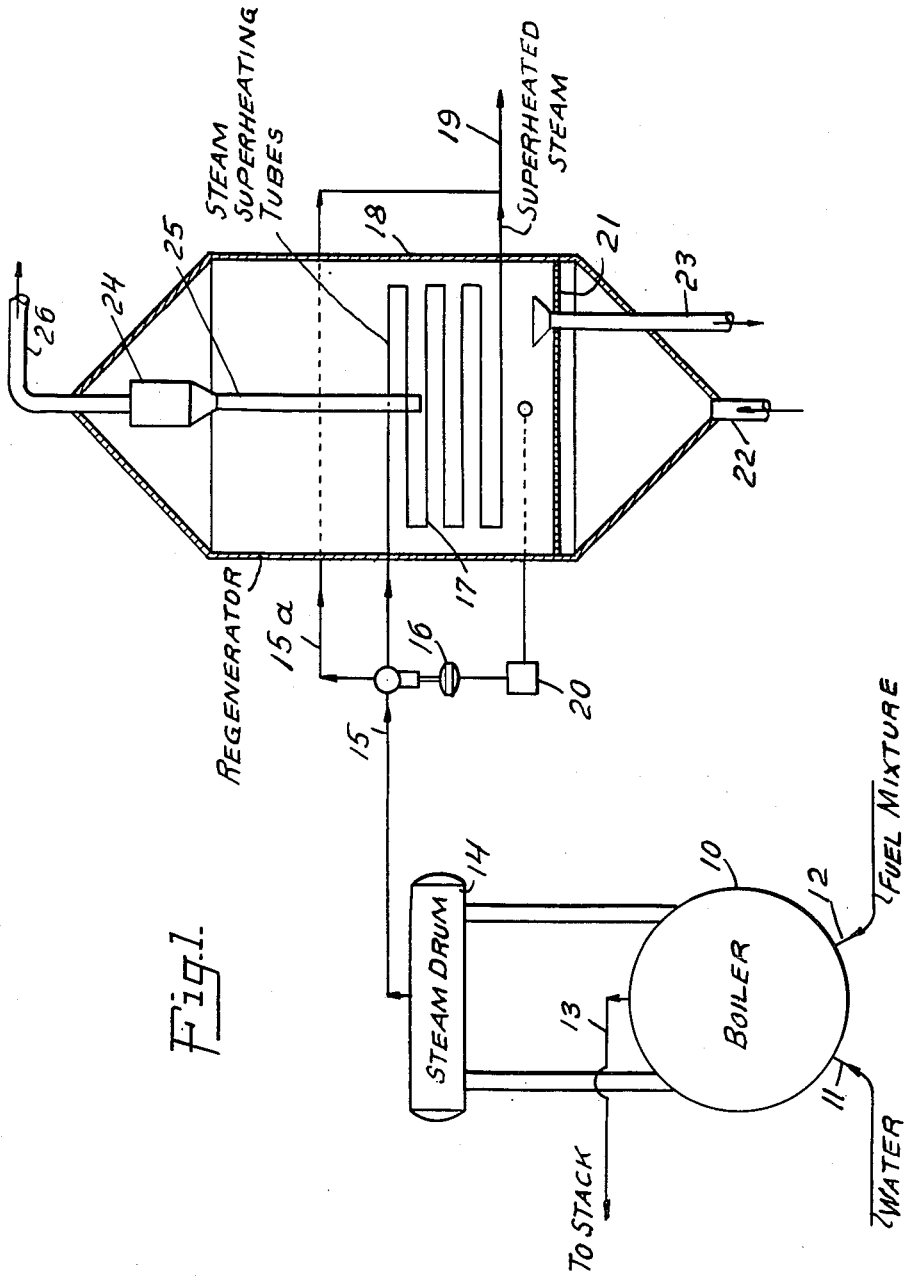
INVENTOR
OLIVER F. CAMPBELL
WILLIAM H. DECKER
BY
Adams, Forward and McLean
ATTORNEYS

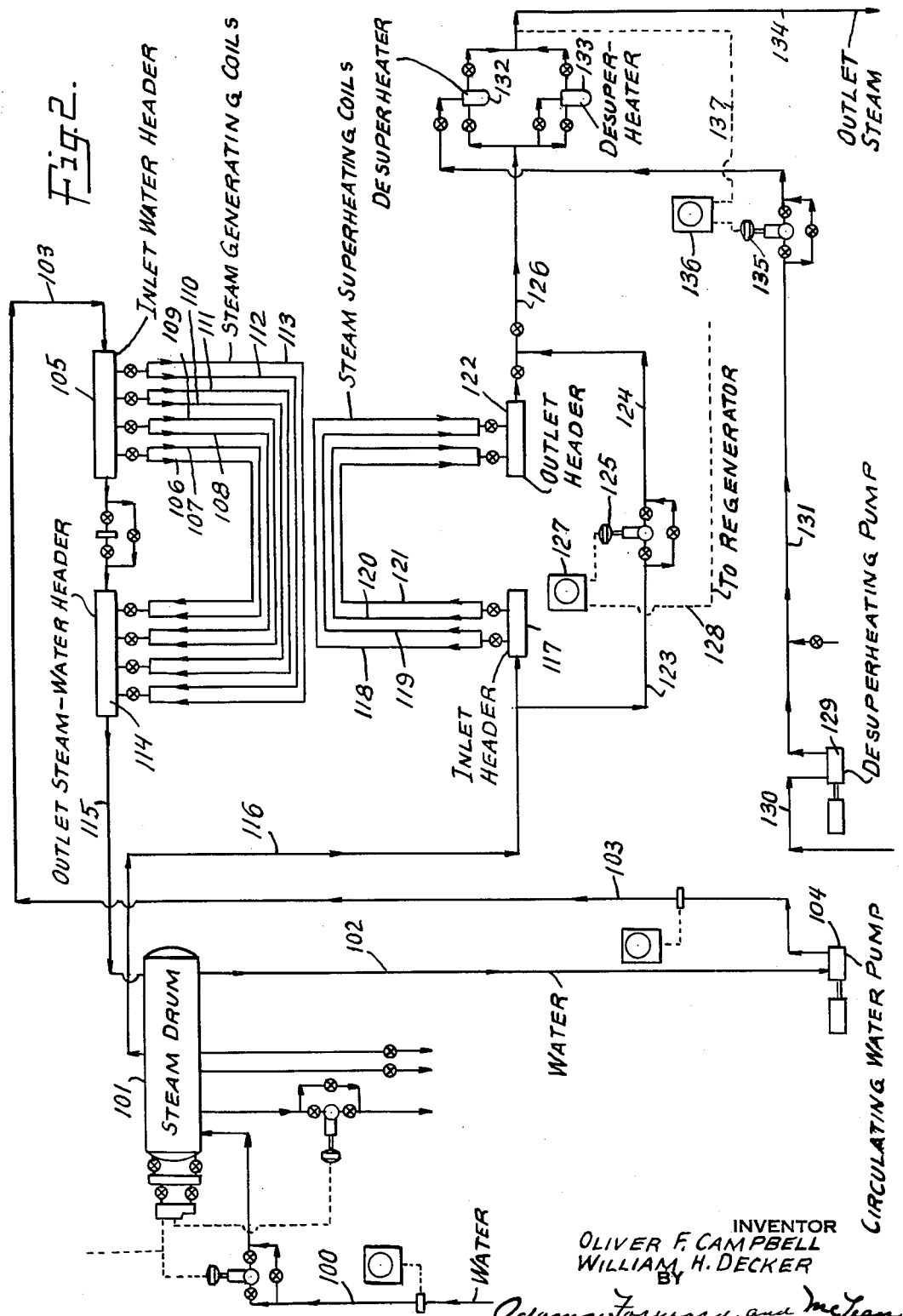

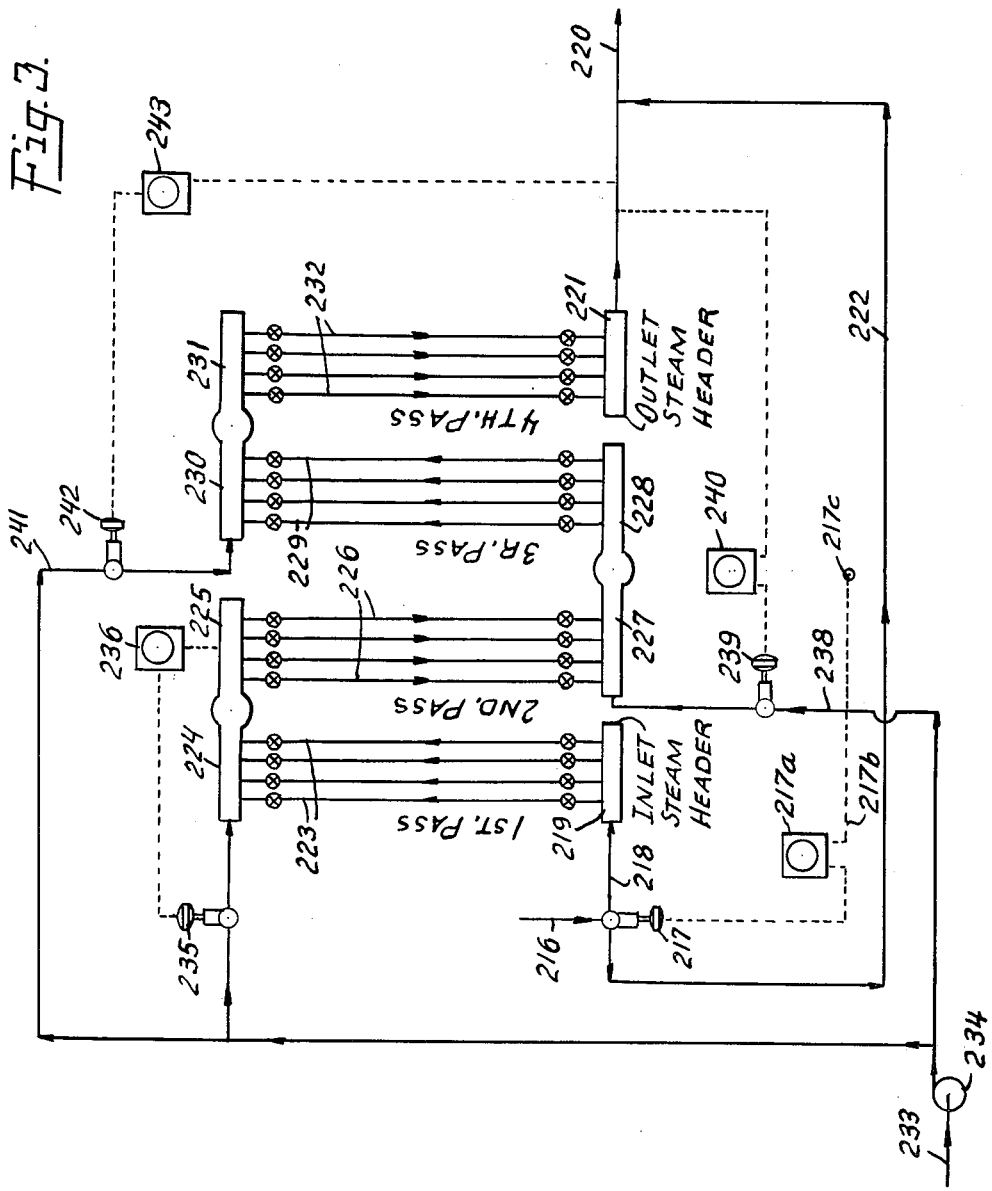

United States Patent Office 2,755,782
Patented July 24, 1956

2,755,782

HEAT RECOVERY AND TEMPERATURE CONTROL SYSTEM FOR BED OF HIGH TEMPERATURE FLUIDIZED SOLIDS

Oliver F. Campbell and William H. Decker, Whiting, Ind., assignors to Sinclair Refining Company, New York, N. Y., a corporation of Maine Application September 9, 1952, Serial No. 308,669

8 Claims. (Cl. 122—459)

Our invention relates to a system for removing heat from a bed of fluidized solids at high temperature and for providing automatic temperature control of the fluidized bed by superheating steam in a tubular coil located within the bed of fluidized solids. Our invention has special application to heat removal from the bed of solid catalyst particles undergoing regeneration by combustion of varbonaceous deposits from the catalyst surface with oxygen in the regenerator of a fluid catalyst conversion unit while automatically controlling the regeneration temperature.

On most fluid catalyst cracking units, it is necessary to remove heat continuously at a controllable rate from the regenerator where spent catalyst is regenerated by burning off carbonaceous material with air in order to maintain equilibrium cracking conditions since the exothermic heat of regeneration largely imparted to the catalyst, is transmitted to the fresh oil feed to the cracking reactor. It is also necessary to remove heat continuously to prevent undue regeneration temperature levels tending to sinter or deactivate the catalyst permanently by area loss. Conventionally, the necessary heat removal has been accomplished by withdrawing a portion of the catalyst from the bed of catalyst in the regenerator undergoing regeneration and circulating it through a tubular waste heat boiler so as to cool it before return to the catalyst bed. Although this system has performed satisfactorily in commercial units, it is expensive from the operational and maintenance standpoint due to erosive action of the catalyst circulating in the transfer lines, the necessity of automatic slide valve control to control circulation rate and the requirements of compressed air necessary to maintain circulation. In addition, the system requires considerable vertical height to provide sufficient head for positive circulation through the waste heat boiler and into the carrier air line for return to the regenerator. The size, strength and expense of the supporting structure therefore is substantially increased which adds materially to the total construction costs.

The installation of water coils in the regenerator for steam generation has been proposed as a means of heat recovery and temperature control but such a system suffers from several distinct disadvantages. Since each water coil must be either 100% in service or out of service, it is impossible to adjust the rate of heat removal to the inevitable variations in regenerator temperature level by throttling one or more of the coils in order to modulate the control of heat removal and hence provide flexible control over regenerator bed temperature. Thus it is necessary either to place additional coils in operation or take coils out of operation to adjust the rate of heat removal. Only stepwise control of regenerator heat therefore is possible. The result is unsatisfactory performance from the operating standpoint and an extra burden of cost due to the special operator attention required. Moreover, the rapid temperature changes occurring in the tube walls when coils are placed in service to adjust temperature level and heat removal rate shortens the operating life of the coil and results in excessive coil maintenance cost by reason of the rapid quenching of the metal as the water phase flows into and throughout the length of the coil.

We provide improved control over rate of heat removal with automatic temperature control of both the fluidized solids bed temperature and the outlet steam temperature, if desired, in a system employing steam superheating as the basic heat removal means. Saturated steam is generated at elevated pressure and is passed through a tubular coil located within the fluidized solids bed while a portion of the steam is by-passed continuously around the superheating coil to its outlet. The rate of heat removal from the fluidized bed is controlled by regulating the amount of bypass steam in response to temperature change in the fluidized bed. Additional control over rate and capacity of heat removal is obtained by employing a coil serially connected tubes and adjusting the steam temperature at the inlet to at least one of the tube passes in response to the temperature of the steam at a control point along the coil. Thus a cooling spray may be injected into the steam flow at the outlet of one pass at a rate controlled by change in the temperature of the steam at the inlet of a succeeding pass. The quality of the superheated steam discharge from the superheater outlet may be controlled, where desirable for the turbine operation or process purposes by providing for injection of a cooling spray into the discharge steam at a rate controlled by the outlet temperature.

Our invention will be more fully understood by consideration in connection with the accompanying drawings.

Fig. 1 of the drawings represent diagrammatically and schematically the flow of steam and points of control according to our invention.

Fig. 2 of the drawings represents a generalized flow diagram illustrating the steam flow and temperature control means in greater detail.

Fig. 3 of the drawings represents a flow diagram of a four coil system employing interstage desuper-heating.

In the system illustrated in Fig. 1, steam is generated in the tubes of boiler 10 from water charged as indicated by line 11 by means of the heat release effected by burning a fuel and air mixture in the furnace of the boiler or by heat transfer from hot waste gases introduced as by connection 12. Flue gases as indicated by line 13 are released to a stack. Saturated steam accumulating in steam drum 14 is passed by means of line 15 through by-pass valve control system 16 to the inlet of tubular coil 17 arranged within a fluidized catalyst bed undergoing regeneration in regenrator 18.

A portion of the steam passed from steam drum 14 through line 15 is continuously by-passed through line 15a around coil 17 to coil outlet 19. The amount of by-pass steam is controlled automatically in response to temperature change within the fluidized bed as indicated by temperature recorder means 20.

The remaining elements illustrated in regenerator 18 are the conventional distributing grid 21, spent catalyst riser 22, regenerated catalyst standpipe 23, cyclone system 24, equipped with dip leg 25, and flue gas overhead line 26.

As illustrated in the system shown in Fig. 2 of the drawings, an integral system of steam generating coils and steam superheating coils within the regenerator is provided. Make-up water is charged to the system from the feed pumps through valve line 100 to steam drum 101. Water is circulated from steam drum 101 through lines 102 and 103 by means of pump 104 to inlet water header 105. Inlet water header 105 is located outside the regenerator shell. The flow of water is in parallel through tubular coils 106, 107, 108, 109, 110, 111, 112 and 113 to the outlet steam and water header 114. The steam-water mixture is returned to steam drum 101 by means of line 115. Saturated steam from steam drum 101 is passed by means of line 116 to inlet header 117. From inlet header 117 the steam may be passed in parallel or serial flow through tubular coils 118, 119, 120 and 121 to outlet header 122.

A portion of the saturated steam from steam drum 101 passing through line 116 however is by-passed continuously by means of lines 123 and 124 under control of automatic valve means 125 to steam outlet line 126. The operation of valve 125 is automatically controlled through temperature recorder 127 in response to temperature change in the regenerator bed as indicated by dotted line connection 128 to thermometric means located within the bed. To provide further temperature control, water which may be steam condensate is pumped by desuperheating pump 129 through lines 130 and 131 to steam desuperheaters 132 and 133 wherein the water is injected as a cooling spray in an amount controlled to regulate the temperature of the steam in outlet line 126 and advantageously discharge steam at a constant temperature and pressure through outlet steam line 134. The amount of the cooling spray injected in desuperheaters 132 and 133 is controlled by means of automatic control valve means 135 controlled by temperature recorder 136 connected as indicated by 137 in a manner recording the temperature in outlet steam line 134.

Advantageously, a similar automatic desuperheating or respray system is provided with a serially arranged system of regenerator superheating coils in order to reduce the steam temperature after one or more passes through the bed in response to the inlet steam temperature at a subsequent pass. Operation in this manner provides increased flexibility and control over the rate of heat removal from the regenerator, and hence the regenerator bed temperature, as well as improved efficiency of heat removal. At the same time positive control over the final outlet steam temperature may be provided.

In Fig. 3, only the coil layout of a four-pass system is shown diagrammatically in order to illustrate interstage desuperheating as a modification of our invention. Saturated steam passes from the steam drum (not shown) into line 216. The bulk of the saturated steam is passed by control valve system 217 to line 218 connecting with first pass inlet header 219. A portion of the steam from line 216 is by-passed continuously around the coil system to outlet line 220 from outlet header 221 by means of line 222. The amount of steam by-passed is regulated by controller 217a and valve 217 in response to temperature change in the regenerator bed as indicated by dotted line connection 217b to thermometric means 217c located in the bed.

From inlet header 219, steam flow is in parallel through tubes 223 to outlet header 224. From the inlet header 225 to the second pass, the flow is in parallel through tubes 226 to outlet header 227; from thence through third pass inlet header 228 and tubes 229 to outlet header 230; and from thence through fourth pass inlet header 231 and tubes 232 to outlet header 221. Heat removal efficiency and temperature control are improved by pumping water through line 233 by pump 234 to automatic control valve 235. Automatic control valve admits cooling water to first pass outlet header 224 at a rate controlled by the temperature within second pass inlet header 225 through temperature controller 236. Spray water to the second pass outlet header 227 through line 238 is controlled by valve 239 by temperature controller 240 in response to the temperature of the steam in the steam outlet line 220. Similarly, spray water to the third pass outlet header 230 through line 241 is controlled by valve 242 through temperature controller 243 in response to the temperature of the steam in outlet line 220.

In operation according to our invention, modulated regenerator temperature control is provided by superheating steam for heat removal and by regulating the rate of heat removal by automatic by-pass steam flow. Steam generated at a pressure allowing for the pressure drop through coil 17 is introduced into the coil from line 15 as shown in Figure 1. Assuming a pressure drop of about 25 p. s. i. through each pass of the coil, which is advisable in order to provide positive control in the by-pass system and to assure a high mass steam flow through the coils, a steam drum pressure for a 4-pass system of about 675 to 700 p. s. i. g. for the final production of 565 p. s. i. g.— 750° F. steam from the superheater outlet should be provided. Normal operation should be based upon by-passing about 25% of the total steam around the superheater coils. This provides sufficient latitude for operating flexibility. Accordingly, the heat transfer surface of the tubes in coil 17 assumes normal by-pass of 25% of the steam from line 15 by appropriate setting of valve 16 to line 15a connecting with superheater coil outlet line 19. As the temperature of the catalyst bed tends to depart from the normal operating temperature, the temperature change is automatically recorded by temperature controller 20 and appropriate adjustment is automatically made in the setting of valve 16 to increase the amount of by-pass steam to compensate for a drop in the regenerator temperature or to decrease the amount of by-pass steam to compensate for an increase in regenerator temperature.

An additional and important means of temperature control is provided by employing a multi-pass coil design having serially arranged tubes with controlled respray desuperheating between passes as indicated in Figure 3. Constant surface area then is provided for all of the passes instead of attempting to provide exactly the amount of surface required at the design amount of by-pass. The desuperheating system reduces the temperature of steam leaving one pass so that the rate and efficiency of heat removal in the next pass are promoted. In the operation illustrated, water which may be condensate collected incidentally in the system is pumped to spray headers 224, 227 and 230 and injected into the steam flow by means of injection sprays. The rate of spray water injection is advantageously controlled automatically in response to the steam temperature into the next succeeding pass. By designing the respray headers with sufficient capacity, the heat removal per pass can be varied over a very broad range. In addition, multi-pass design provides additional flexibility since any one tube in any one pass may be taken out of service to change the heat absorption rates.

In the operation illustrated in Figure 2, steam temperature control is provided by operating with a higher outlet temperature for the blend of superheated and by-pass steam than desired for the final steam temperature. The blend temperature then is reduced to the final outlet steam temperature by controlled desuperheating. As indicated in Figure 2, water is pumped by pump 129 through line 131 and injected in the form of a spray into desuperheating pots 132 and 133. The rate of spray water injection is controlled automatically by temperature controller 136 and valve 135 in response to the final outlet steam temperature.

Although our invention is specially adapted to provide modulating regenerator temperature control by heat removal through steam superheating, it may be adapted readily to primary production of superheated steam utilizing the fluidized solids bed principle as the heating means. In this application of our invention, water coils are advantageously provided within the bed to generate the steam to be supplied to the superheater coils. The by-pass control means advantageously is connected for automatic actuation in response to the steam outlet temperature although it may be operated in response to changes in the bed temperature for greater sensitivity.

We claim:

1. A system for removing heat from a bed of fluidized solids and for providing temperature control by steam superheating which comprises generating saturated steam at elevated pressure, passing saturated steam generated thereby through a tubular coil located in a bed of fluidized solids maintained at high temperature, by-passing a portion of the saturated steam continuously around the coil in a controlled amount of the coil outlet, controlling the rate of heat removal from the bed of fluidized solids by increasing the amount of by-pass steam in response to temperature decreases and decreasing the amount of by-pass steam in response to a temperature increase within the fluidized bed, and discharging superheated steam from the coil outlet.

2. A system for removing heat from a bed of fluidized solids and for providing temperature control by steam superheating which comprises generating saturated steam at elevated pressure, passing saturated steam generated thereby through a tubular coil located in a bed of fluidized solids maintained at high temperature, controlling the temperature of the steam passing through the coil and rate of heat removal from the bed of fluidized solids by injecting a cooling spray into direct contact with the steam at a point intermediate the coil inlet and the coil outlet and discharging superheated steam from the coil outlet.

3. A system for removing heat from a bed of fluidized solids and for providing temperature control by steam superheating which comprises generating saturated steam at elevated pressure, passing saturated steam generated thereby through a tubular coil located in a bed of fluidized solids maintained at high temperature, by-passing a portion of the saturated steam continuously around the coil in a controlled amount to the coil outlet, controlling the rate of heat removal from the bed of fluidized solids by increasing the amount of by-pass steam in response to temperature decreases and decreasing the amount of by-pass steam in response to a temperature increase within the fluidized bed, controlling the temperature of the steam passing through the coil by injecting a cooling spray into direct contact with the steam at a point intermediate the coil inlet and the coil outlet, discharging superheated steam from the coil outlet, and controlling the temperature of the discharge steam by injecting a cooling spray in direct contact therewith in a controlled amount.

4. A system for removing heat from a bed of fluidized solids and for providing temperature control by steam superheating which comprises generating saturated steam by introducing water to a tubular coil located in a bed of fluidized solids, passing steam generated thereby through a second tubular coil located in the bed of fluidized solids maintained at high temperature, by-passing a portion of the saturated steam continuously around the coil in a controlled amount to the coil outlet, controlling the rate of heat removal from the bed of fluidized solids by increasing the amount of by-pass steam in response to temperature decreases and decreasing the amount of by-pass steam in response to a temperature increase within the fluidized bed, and discharging superheated steam from the second coil.

5. Apparatus for removing heat from a bed of fluidized solids at high temperature and for providing temperature control which comprises an enlarged vessel adapted to contain a bed of fluidized solids, a tubular coil situated within the vessel below the bed level, means for supplying saturated steam at elevated pressure to the coil, means for by-passing a portion of the steam continuously around the coil to its outlet, means for recording temperature change within the fluidized solids bed, and automatic control valve means for increasing the amount of by-pass steam responsive to temperature decreases and decreasing the amount of by-pass steam responsive to temperature increases indicated by said temperature recording means.

6. Apparatus for removing heat from a bed of fluidized solids at high temperature and for providing temperature control which comprises an enlarged vessel adapted to contain a bed of fluidized solids, a coil of serially connected tubes situated within the vessel below the bed level, means for supplying saturated steam at elevated pressure to the coil, means for by-passing a portion of the steam continuously around the coil to its outlet, means for recording temperature change within the fluidized solids bed, automatic control valve means for increasing the amount of by-pass steam responsive to temperature decreases and decreasing the amount of by-pass steam responsive to temperature increases indicated by said temperature recording means, and means responsive to the temperature of steam within the coil for injecting a cooling spray at a point intermediate the coil inlet and outlet.

7. Apparatus for removing heat from a bed of fluidized solids at high temperature and for providing temperature control which comprises an enlarged vessel adapted to contain a bed of fluidized solids, a coil of serially connected tubes situated within the vessel below the bed level, means for supplying saturated steam at elevated pressure to the coil, means for by-passing steam continuously around the coil to its outlet, means for recording temperature change within the fluidized solids bed, means responsive to the temperature within the coil for injecting a cooling spray at a point intermediate the coil inlet and outlet, automatic control valve means for increasing the amount of by-pass steam responsive to temperature decreases and decreasing the amount of by-pass steam responsive to temperature increases indicated by said temperature recording means, and means responsive to temperature at the coil outlet for injecting a cooling spray in controlled amount into the coil outlet system.

8. Apparatus for removing heat from a bed of fluidized solids at high temperature and for providing temperature control which comprises an enlarged vessel adapted to contain a bed of fluidized solids, a tubular coil situated within the vessel below the bed level, means for feeding water to said coil and discharging steam therefrom, second tubular coil situated within the vessel below the bed level, means for supplying steam from the first coil discharge means to the second coil, means for by-passing a portion of the steam continuously around the second coil to its outlet, means for recording temperature change within the fluidized solids bed, and automatic control valve means for increasing the amount of the by-pass steam responsive to temperature decreases and decreasing the amount of by-pass steam responsive to temperature increases indicated by said temperature recording means.

References Cited in the file of this patent

UNITED STATES PATENTS

| | | |
|---|---|---|
| 1,952,350 | Armstrong | Mar. 27, 1934 |
| 2,224,014 | Dunham et al. | Dec. 3, 1940 |
| 2,446,995 | Bay | Aug. 17, 1948 |
| 2,458,433 | Simpson | Jan. 4, 1949 |
| 2,463,888 | Linaker | Mar. 8, 1949 |
| 2,517,812 | Wade | Aug. 8, 1950 |
| 2,590,712 | Lacerenza | Mar. 25, 1952 |
| 2,627,522 | Krek et al. | Feb. 3, 1953 |
| 2,674,612 | Murphree | Apr. 6, 1954 |